United States Patent Office 3,839,428
Patented Oct. 1, 1974

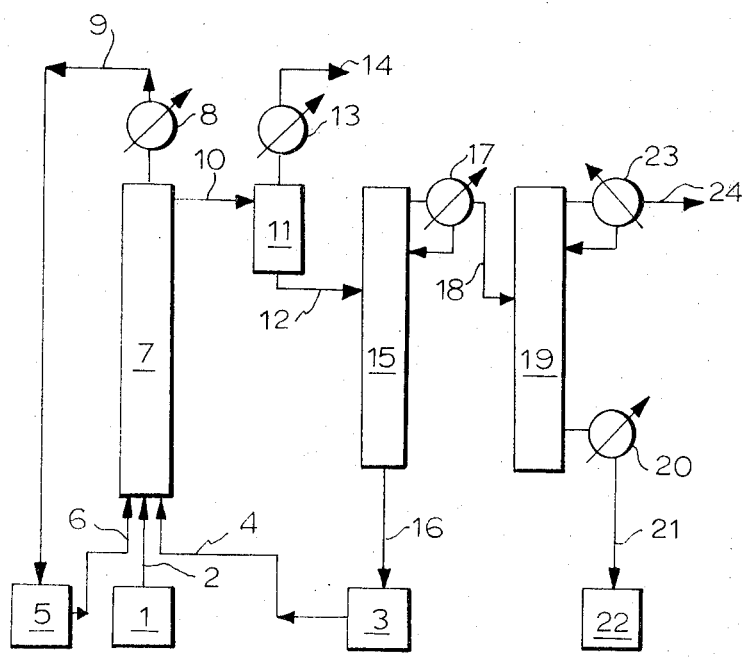

3,839,428
PROCESS FOR PREPARATION OF ORGANIC
CARBOXYLIC ACIDS
Nobuo Isogai, Niigata, Japan, assignor to Japan Gas-Chemical Company Inc., Tokyo, Japan
Filed May 26, 1970, Ser. No. 40,599
Claims priority, application Japan, May 28, 1969,
44/40,931, 44/40,932; Dec. 30, 1970, 46/1,745
Int. Cl. C07c 51/00
U.S. Cl. 260—514 R            13 Claims

ABSTRACT OF THE DISCLOSURE

A process for the preparation of organic carboxylic acids which comprises converting a formic acid ester expressed by the general formula

HCOOR wherein R stands for a chain or cyclic aliphatic hydrocarbon radical which may have an aliphatic unsaturation, an aryl radical, an aralkyl radical or a heterocyclic radical,
at an elevated temperature under raised pressure of carbon monoxide to an organic carboxylic acid expressed by the general formula

RCOOH wherein R is as defined above.

---

This invention relates to a process for converting formic acid esters directly to corresponding organic carboxylic acids. More specifically, this invention relates to a process for the preparation of organic carboxylic acids which comprises converting a formic acid ester expressed by the general formula

HCOOR    (I)

wherein R stands for a chain or cyclic aliphatic hydrocarbon radical which may have an aliphatic unsaturation, an aryl radical, an aralkyl radical or a heterocyclic radical,
at an elevated temperature under raised pressure of carbon monoxide to an organic carboxylic acid expressed by the general formula

RCOOH    (II)

wherein R is as defined above.

There have been known various methods for the synthesis of organic carboxylic acids, but there has not ever been known a reaction of direct conversion of a formic acid ester HCOOR to a corresponding organic carboxylic acid RCOOH.

The novel reaction of this invention is expressed by the following reaction formula:

$$\text{HCOOR} \xrightarrow{\text{(CO)}} \text{RCOOH} \quad \text{(III)}$$

From the above reaction formula carbon monoxide seems to take no part in the reaction but in this invention it is essential to conduct the process under raised pressure of carbon monoxide.

As the radical R in the formic acid ester HCOOR to be used as the starting material in this invention there may be cited alkyl radicals of 1–6 carbon atoms, preferably 1–4 carbon atoms, such as methyl, ethyl, n-propyl, iso-propyl, n-butyl, iso-butyl, sec-butyl, tert-butyl, amyl and iso-amyl; unsaturated alkyl (alkenyl and alkynyl) radicals having 2–6 carbon atoms such as vinyl, allyl and propargyl; alicyclic hydrocarbon radicals having 4–10 carbon atoms such as cyclobutyl, cyclopentyl, cyclohexyl, methyl cyclohexyl, and cyclohexenyl; acylic or cyclic terpene radicals having 5–15 carbon atoms; aryl radicals having 6–12 carbon atoms such as phenyl, tolyl and xylyl; aralkyl radicals having 7–14 carbon atoms such as benzyl, methyl benzyl and phenethyl; and 5- or 6-membered heterocyclic radicals having 4–10 carbon atoms such as pyridyl, methyl pyridyl, furyl, piperidyl and indolyl.

The formic acid ester which may be advantageously used in this invention includes lower alkyl esters of formic acid, unsaturated lower alkyl esters of formic acid, cycloalkyl esters of formic acid and aralkyl esters of formic acid. In this specification by the term "lower" is meant a phrase "having 1–4 carbon atoms."

In this invention carbon monoxide may be used singly or in admixture with an inert gas. A small amount of hydrogen may be contained in carbon monoxide or its admixture with an inert gas. Use of elevated pressure of carbon monoxide not only promotes the reaction of formula (III) but also prevents the decomposition of the formic acid ester expressed by the following formula:

$$\text{HCOOR} \rightarrow \text{HR} + \text{CO}_2 \quad \text{(IV)}$$

or $$\text{HCOOR} \rightarrow \text{ROH} + \text{CO} \quad \text{(V)}$$

As the reaction rate is comparatively low at a pressure of less than 80 kg./cm.² gauge, it is especially preferable to use carbon monoxide pressurized to more than 80 kg./cm.² gauge. The higher the pressure is, the more the decomposition of the formic acid ester is prevented and the higher the reaction rate is made. In view of economization of the operation, however, it is advantageous to carry out the reaction under a pressure of 150–700 kg./cm.² gauge. In case a mixture of carbon monoxide with an inert gas and/or hydrogen is used, it is sufficient to maintain the partial pressure of carbon monoxide at 50–300 kg./cm.² gauge. It is sufficient to feed carbon monoxide such that the pressure may be maintained within the above range and it is unnecessary to feed carbon monoxide in the equimolar amount to the starting formic acid ester.

Generally the reaction is carried out at a temperature ranging from 100° C. to 350° C. At a lower temperature the reaction is allowed to advance but the reaction rate is relatively low. Accordingly, it is not preferred practically to effect the reaction at lower temperatures. As side reactions tend to occur at higher temperatures, it is not preferred to carry out the reaction at too high a temperature. Preferable temperatures are within a range of from 180° C. to 300° C.

The reaction of this invention is allowed to advance even in the absence of a catalyst when the starting formic acid ester is subjected to the above-mentioned conditions. In order to increase the conversion rate of the starting formic acid ester to a corresponding carboxylic acid, however, it is advantageous to use a catalyst. Suitable catalysts may be optionally selected from transition metals and transition metal compounds having an activity of converting a formic acid ester to a corresponding organic carboxylic acid. Catalysts containing a metal of Group VIII of the Periodic Table capable of forming a metal carbonyl by reaction with carbon monoxide may be suitably used in this invention. Among the catalysts containing such transition metal, those containing iron, cobalt or nickel may be used in this invention with high advantage.

As such catalyst there may be cited metals of Group VIII of the Periodic Table such as iron, cobalt and nickel and compounds of such metals. As such metal compound there may be suitably used organic acid salts, hydroxides, carbonates, bicarbonates, nitrates, sulfates, oxides, salts of a halogen oxyacid, complexes of organic onium compounds, halides, and carbonyl compounds (containing carbonyl hydride etc.) of metals of Group VIII of the Periodic Table, and complexes of such metals with beta-diketones or beta-keto acid esters. Acetates, propionates and the like may be used as organic acid salts. A salt of a metal of Group VIII of the Periodic Table with an organic carboxylic acid to be formed by the reaction is particularly preferred. As the metal complex with a beta-diketone or beta-keto acid ester there may be used complex salts of a metal of Group VIII of the Periodic Table with acetylacetone or ethyl acetoacetate. As the complex of organic onium compounds there may be used, for example, di-[butylpyridinium]-cobalt tetrabromide, di-[tetraethylammonium]-nickel tetraiodide and di-[tetramethylammonium]-cobalt diiodidediacetate.

These compounds of metals of Group VIII of the Periodic Table, though the said metal is polyvalent, are not limited to compounds having a specific valency. For example, with iron, both ferrous and ferric compounds may be used.

I have found that among the above-mentioned group of catalysts those containing a metal of Group VIII of the Periodic Table and a halogen are particularly effective for converting formic acid esters to corresponding organic carboxylic acids at high conversion. Such catalysts containing said metal and a halogen may be either in the form of a halide such as cobalt iodide, nickel iodide, cobalt bromide and cobalt chloride or a salt of a halogen oxyacid or a complex of an organic onium compound, or in the form of a mixture comprising, for instance, a combination of (A) (a) a metal per se, (b) an organic salt, (c) a beta-diketone or beta-keto acid ester complex, (d) a hydroxide, (e) a carbonate, (f) a bicarbonate, (g) a nitrate, (h) a sulfate, (i) an oxide or (j) a carbonyl compound of a metal of Group VIII of the Periodic Table, and (B) (a') a molecular halogen, (b') a hydrohalogenic acid, (c') an alkali metal or alkaline earth metal halide or (d') a halogen oxyacid or its alkali metal or alkaline earth metal salt. Optional oxyacids such as hypobromous acid, bromous acid, chloric acid and perbromic acid may be used as the halogen oxyacid.

Although the amount used of the catalyst containing a metal of Group VIII of the Periodic Table varies depending on the kind of the cataylst, in this invention the catalyst is used ordinarily in an amount of 0.2–200 milligram atoms, preferably 5–30 milligram atoms, reckoned as the metal, per mol of the starting formic acid ester. In case a halogen is made present in the catalyst, the halogen component is used in an amount of 0.1–500 milligram atoms, preferably 1–80 milligram atoms, reckoned as the halogen atom, per mol of the starting formic acid ester. A use of the metal and halogen components beyond above-mentioned upper limit does not affect the reaction but is not advantageous economically.

In this invention it is possible to use other catalysts instead of the above-mentioned catalysts containing a metal of Group VIII of the Periodic Table. For instance, catalysts containing a metal of Group IIb of the Periodic Table are also effective for converting formic acid esters to corresponding organic carboxylic acids. Among the catalysts containing such transition metal, one containing mercury may be used in this invention with high advantage. As such catalyst there may be used (a) a metal per se (inclusive of amalgam), (b) an organic acid salt (c) a beta-diketone or beta-keto acid ester complex (d) a hydroxide, (e) a carbonate, (f) a bicarbonate, (g) a nitrate (h) a sulfate, (i) an oxide (j) a salt of a halogen oxyacid, (k) a complex of an organic onium compound or (l) a halide of a metal of Group IIb of the Periodic Table. These compounds of a metal of Group IIb of the Periodic Table, though the said metal is polyvalent, are not limited to compounds having a specific valency. For example, with mercury, both mercurous and mercuric compounds may be used.

Catalysts containing a halogen as well as a metal of Group IIb of the Periodic Table are particularly preferably used as the said metal-containing catalyst.

Thus halides, salts of a halogen oxyacid or complexes of an organic onium compound of a metal of Group IIb of the Periodic Table and combinations of (A) (a) a metal per se, (b) an organic acid salt, (c) a beta-dietone or beta-keto acid ester complex, (d) a hydroxide, (e) a cabonate, (f) a bicarbonate, (g) a nitrate, (h) a sulfate or (i) an oxide of a metal of Group IIb of the Periodic Table and (B) (a') a molecular halogen, (b') a hydrohalogenic acid, (c') an alkali metal or alkaline earth metal halide, or (d') a halogen oxyacid or its alkali metal or alkaline earth metal salt are preferably used in this invention.

The same matters as described with respect to the catalyst containing a metal of Group VIII of the Periodic Table hold true in the catalyst containing a metal of Group IIb of the Periodic Table concerning amounts used of metal of Group IIb of the Periodic Table and halogen.

When there is compared a catalyst containing a metal of Group VIII of the Periodic Table with a catalyst containing a metal of Group IIb of the Periodic Table, the former, generally, is superior to the latter in catalytic activity. Further in this invention, when a halogen is used in the catalyst it is possible not only to promote the reaction rate remarkably, but also to heighten the solubility of the metal used as catalyst in the reaction system, generally.

The reaction of this invention can progress in the absence of a solvent, but use of a suitable solvent, for instance, a polar solvent gives advantages in conducting the reaction. Namely, it has been found that the reaction of this invention can be extremely promoted by employing as solvent an organic compound of a high polarity having the property of dissolving the catalyst to be used in this invention. As such solvent there may be preferably used dipolar aprotic solvents, for instance, amides such as formamide, N-methylformamide, N,N-dimethylformamide, acetamide, N-methylacetamide, N,N-dimethylacetamide and N,N-dimethylpropionamide; cyclic amides such as alpha-pyrrolidone, N-methylpyrrolidone, alpha-piperidone and N-methylpiperidone; and nitriles such as acetonitrile and propionitrile. There may be also used heterocyclic compounds such as pyridine, picoline, piperidine and morpholine, and ketones having a high boiling point such as acetophenone. Generally it is preferable to feed the catalyst to the reaction system in the form of a solvent solution, but this invention is not limited to this embodiment alone.

In the process of this invention an optional solvent may be selected and used so far as it can dissolve the catalyst advantageously. In the case of a solvent having a boiling point higher than that of the intended organic carboxylic acid, it is possible to recover the intended organic acid from the reaction mixture by distillation, leaving the catalyst in the form of a solution of the organic polar solvent used. Since such solution of the catalyst in the solvent can be recycled to the reaction system and used repeatedly, the use of such high boiling point solvent is advantageous when the process of this invention is performed continuously.

When the above-mentioned amides are used, the acyl group-exchanging reaction is allowed to occur partially between the solvent amide and the resulting organic carboxylic acid, resulting in formation of an amide of the resulting organic carboxylic acid and an organic carboxylic acid corresponding to the acyl group of the solvent amide. Accordingly, when an amide is used as the solvent, it is desirable to use amide corresponding to the acyl group of the intended organic carboxylic acid (RCOOH), namely one expressed by the formula

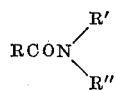

wherein R is as defined above and R' and R" stand for a straight chain lower alkyl group.

Since the use of a cyclic amide does not cause formation of an organic acid corresponding to the acyl group of the solvent amide as by-product by the acyl group-exchanging reaction, in the process of this invention it is particularly preferable to use a cyclic amide.

Although any particular disadvantage it not brought about in conducting the reaction of this invention by employing the solvent in too great an amount, troublesome operations are required for recovering the solvent. On the other hand, in case the amount used of the solvent is too small, it is difficult to dissolve the catalyst sufficiently. Accordingly, in this invention it is suitable to use the solvent in an amount of 0.2–10 mols per mol of the starting formic acid ester.

In the process of this invention the side reaction expressed by above-mentioned formula (V) is sometimes caused to occur depending on the reaction conditions. In such case by-product ROH reacts with resulting organic carboxylic acid RCOOH to form by-product RCOOR, which is contained in the product liquor. I have found that the above side reaction can be inhibited almost completely by adding a very small amount, for instance, 0.005–0.1 mol per mol of the starting formic acid ester, of RCOOR to the starting material in advance.

As detailed above, according to the process of this invention, formic acid esters can be advantageously converted to corresponding organic carboxylic acids. When the reaction is effected in the absence of a solvent, it is possible to recycle and use repeatedly the catalyst in the dissolved state in the product liquor. Further, when a solvent having a boiling point higher than that of the intended organic carboxylic acid, the resulting organic carboxylic acid can be recovered by simple distillation, and at the same time the catalyst and solvent are recovered as the remaining solution from the bottom of the distillation column and recycled to the reaction system and used repeatedly. The process of this invention may be conducted either continuously or batchwise, but better results can be obtained by conducting the process continuously. When the reaction is carried out by a continuous process, the liquid space velocity is 0.1–10 hr.$^{-1}$, preferably 0.5–5 hr.$^{-1}$.

The appended drawing is a flow sheet illustrating one embodiment of the process of this invention where the process is carried out continuously.

The process of this invention will now be described by referring to the appended drawing.

The starting formic acid ester is fed to reaction tube 7 from tank 1 through line 2. The catalyst, in the form of a solvent solution when a solvent is used or a solution in the product liquor when the reaction is effected without employing a solvent, is fed to reaction tube 7 from catalyst solution depository 3 through line 4. Carbon monoxide is fed to reaction tube 7 from pressure accumulator 5 and line 6 so as to keep reaction tube 7 under raised pressure of carbon monoxide. Carbon monoxide discharged from line 9 through reflux condenser 8 mounted at the top of the reaction tube is returned to pressure accumulator 5 by means of a compressor (not shown) and is recycled inside the reaction tube. The product liquor passes through line 10 and is forwarded to gas liquid separator 11 where carbon monoxide dissolved in the product liquor is separated. The separated gas is exhausted through condenser 13. It is possible to return the gas to pressure accumulator 5 and use it again. The degassed product liquor passes through line 12 and is forwarded to column 15 for separating and recovering the catalyst and solvent. Column 15 is a simple distillation column. The catalyst and solvent are recovered from the bottom of the column in the form of a solution of the catalyst in the solvent. The solution is continuously returned to catalyst solution depository 3 through line 16 and is recycled to the reaction system. In case a solvent is not used, the catalyst is recovered in the form of a concentrated solution of the catalyst in a part of the product liquor and is then used repeatedly. The distillate from the column top is composed mainly of the resulting organic carboxylic acid but it still contains the unreacted formic acid ester and, in some cases small amounts of other esters than formic acid ester and alcohols formed as by-products are contained in the distillate. The distillate is forwarded to rectification column 19 through partial condenser 17 and line 18. The unreacted formic acid ester is recovered from the column top through partial condenser 23 and line 24, returned to line 2 and then introduced to the reaction system together with the starting formic acid ester. An organic carboxylic acid having a purity sufficient as end product is distilled at the point several stages above the column bottom, recovered through condenser 20 and line 21 and then stored in product tank 22. In case considerable amounts of esters other than the formic acid ester or alcohols are contained in the distillate at line 24, esters and alcohols formed as by-products are recovered by providing another distillation column. The so-obtained ester by-products are introduced to the reaction tube and used effectively for inhibiting undesired side reactions such as the decomposition of the formic acid ester. The reaction tube may be of either liquid-gas parallel current or liquid-gas counter-current type.

As detailed above, according to this invention formic acid esters can be converted directly to corresponding organic carboxylic acids. Further it is possible to obtain an optional organic corboxylic acid by varying the kind of the residual radical of the formic acid ester. Formic acid esters to be used in this invention can be synthesized easily by conventional methods. Accordingly, the process of this invention makes it possible to provide organic carboxylic acids economically advantageously. When the process of this invention is conducted by employing some suitable catalyst, organic carboxylic acids can be prepared at conversions as high as 90% or more.

This invention will now be described more detailed by referring to examples, but the invention is not limited by these examples.

EXAMPLE 1

A 100-ml. inner capacity stainless steel autoclave of a shaker type is charged with 26 grams (0.433 mol) of methyl formate, and 3.0 grams (0.0096 mol) of cobalt iodide is added thereto. Carbon monoxide is introduced in the autoclave to attain a pressure of 200 kg./cm.$^2$ gauge. The reaction is effected at 230° C. for 1 hour. The maximum reaction pressure is about 470 kg./cm.$^2$ gauge. After termination of the reaction the autoclave is cooled and the reaction product is recovered. Precipitates are separated by filtration and the unreacted methyl formate is also separated by distillation. Further distillation of the remaining liquor gives acetic acid in an amount corresponding to a conversion of 17.3% based on the starting methyl formate.

EXAMPLE 2

The same reactor as used in Example 1 is charged with 14 grams (0.233 mol) of methyl formate, and 26 grams of actophenone and 1.6 grams (0.0051 mol) of cobalt iodide are added thereto. As additive is further added 1.5 grams (0.02 mol) of methyl acetate. Carbon monoxide is introduced to attain a pressure of 150 kg./cm.$^2$ gauge and the reaction is carried out at 220° C. for 1 hour. The reaction pressure is 300 kg./cm.$^2$ gauge. The reaction product is subjected to after-treatments to obtain acetic acid in an amount of 11.5 grams (0.192 mol) which corresponds to a conversion of 82.2% based on the starting methyl formate. Acetophenone used as solvent is recovered almost quantitatively. In case the above run is repeated without addition of methyl acetate, the conversion is 77.9%.

EXAMPLE 3

The reaction is conducted in the same manner as in Example 2 except that 23 grams of N-methylpyrrolidone is used instead of acetophenone and that methyl acetate is not added. As as result, there is obtained acetic acid in an amount corresponding to a conversion of 93.7% based on the starting methyl formate.

EXAMPLE 4

The reaction is conducted according to the continuous process be employing a 300-ml. inner capacity stainless steel reaction tube of 500 mm. length and 30 mm. inner diameter. The reaction conditions are a pressure of 300 kg./cm.$^2$ gauge, a temperature of 220° C., an amount fed of methyl formate of 365 grams per hour (6.08 mols per hour), a liquid space velocity of 1.25 hr.$^{-1}$ and an amount circulated of carbon monoxide of 89 Nl./hr. (4.0 mols per hour). As solvent is fed N-methylacetamide at a rate of 0.92 mol per mol of methyl formate and as catalyst is fed cobalt iodide at a rate of 0.022 mol per mol of methyl formate (in the form of an N-methylacetamide solution containing 9.42% by weight of cobalt iodide). The reaction is continued for a week. Acetic acid is obtained in a yield of 337 grams per hour (5.62 mols per hour). This yield corresponds to a conversion of 92.3% based on the methyl formate feed.

EXAMPLE 5

The reaction is conducted continuously for 48 hours by employing the same reactor as used in Example 4 under the following conditions; a pressure of 400 kg./cm.$^2$ gauge, a temperature of 230° C., a methyl formate feed rate of 366 grams per hour (6.10 mols per hour), a liquid space velocity of 1.25 hr.$^{-1}$, and a carbon monoxide circulating rate of 98 Nl./hr. (4.38 mols per hour). As solvent is fed N-methylpyrrolidone at a rate of 1.0 mol per mol of methyl formate and as catalyst are fed cobalt acetate and iodine at a rate of 0.020 mol per mol of methyl formate, respectively, in the form of a solution in N-methylpyrrolidone used as solvent. As additive is further fed methyl acetate at a rate of 11 grams per hour (0.15 mol per hour). As a result there is obtained acetic acid in a yield of 347 grams per hour (5.77 mols per hour). This yield corresponds to a conversion of 94.7% based on the methyl formate feed.

EXAMPLE 6

The reaction is carried out continuously for 48 hours by employing the same reactor as used in Example 4 under the following conditions; a pressure of 300 kg./cm.$^2$ gauge, a temperature of 230° C., a methyl formate feed rate of 304 grams per hour (5.07 mols per hour), a liquid space velocity of 1.04 hr.$^{-1}$, a circulating rate of carbon monoxide gas containing 3 volume percent of hydrogen of 102 Nl./hr. (4.42 mols per hour reckoned as carbon monoxide). As solvent is fed N-methylpyrrolidone at a rate of 1.04 mols per mol of methyl formate and as catalyst is fed cobalt iodide at a rate of 0.018 mol per mol of methyl formate (in the form of an N-methylpyrrolidone solution containing 5.18% by weight of cobalt iodide). As a result there is obtained acetic acid in a yield of 277 grams per hour (4.62 mols per hour). This yield corresponds to a conversion of 91.3% based on the methyl formate feed.

EXAMPLES 7–11

Runs are conducted in the same reactor as used in Example 4 by varying the kind of the alkyl radical of the formic acid ester, the kind of the solvent, the kind of the catalyst and other reaction conditions. Results of each run are shown in Table 1.

TABLE 1

| | Example Number | | | | |
|---|---|---|---|---|---|
| | 7 | 8 | 9 | 10 | 11 |
| R of formic acid ester HCOOR | CH$_3$— | CH$_3$— | CH$_3$CH$_2$— | CH$_3$CH$_2$CH$_2$— | (CH$_3$)$_2$CH— |
| Formic acid ester feed rate: | | | | | |
| Grams/hour | 323 | 300 | 254 | 220 | 255. |
| Mols/hour | 5.38 | 5.0 | 3.43 | 2.5 | 2.9. |
| Liquid space velocity, hour$^{-1}$ | 1.1 | 1.03 | 0.81 | 0.72 | 1.03. |
| Solvent: | | | | | |
| Kind | Acetonitrile | N,N-dimethylacetamide | N,N-dimethylpropionamide | N,N-dimethylbutyramide | N-methylpyrrolidone. |
| Amount used (mols per mol of HCOOR) | 2.3 | 1.0 | 1.26 | 1.5 | 1.05. |
| Catalyst: | | | | | |
| Kind | Cobalt acetate, 0.020. | Cobalt carbonyl, 0.019. | Cobalt iodide, 0.027. | Nickel iodide, 0.040. | Cobalt bromide, 0.028. |
| Amount used (mols per mol of HCOOR) | Potassium iodide, 0.048. | Molecular iodine, 0.019. | | | |
| Concentration of catalyst solution (percent) | 3.74* | 1.25** | 6.24 | 6.76 | 5.45. |
| Circulating rate of carbon monoxide: | | | | | |
| Nl./hours | 82 | 108 | 85 | 56 | 96. |
| mols/hours | 3.66 | 4.8 | 3.8 | 2.5 | 4.29. |
| Temperature (° C.) | 220 | 220 | 240 | 250 | 210. |
| Pressure (kg./cm.$^2$ gauge) | 400 | 300 | 400 | 420 | 300. |
| Period of continuous operation (hours) | 10 | 48 | 24 | 12 | 12. |
| Organic carboxylic acid RCOOH: | | | | | |
| Space time yield: | | | | | |
| (grams/hours) | 260 | 271 | 204 | 137 | 195. |
| (mols/hours) | 4.34 | 4.51 | 2.75 | 1.56 | 2.22. |
| Conversion (percent) (based on the starting HCOOR) | 80.6 | 90.2 | 80.2 | 62.3 | 76.5. |

*Reckoned as cobalt acetate concentration in catalyst solution.
**Reckoned as cobalt metal concentration in catalyst solution.

EXAMPLE 12

A 100-ml. inner capacity stainless autoclave of a shaker type is charged with 20 grams (0.147 mol) of benzyl formate, 20 grams (0.202 mol) of N-methylpyrrolidone as solvent and 1.7 grams (0.0054 mol) of cobalt iodide as catalyst, and the reaction is effected at 200° C. for 2 hours under pressure of 300 kg./cm.$^2$ gauge of carbon monoxide to give phenylacetic acid in a yield of 14.6 grams (0.107 mol). This yield corresponds to a conversion of 73% based on benzyl formate.

EXAMPLE 13

The same reactor as used in Example 12 is charged with 20 grams (0.122 mol) of 2,5-dimethylbenzyl formate, 15 grams (0.151 mol) of N-methylpyrrolidone as solvent and 1.2 grams (0.0038 mol) of cobalt iodide as catalyst, and the reaction is carried out under the same conditions as in Example 12. As a result there is obtained 2,5-dimethyl phenylacetic acid in a yield of 13.5 grams (0.082 mol). This yield corresponds to a conversion of 67.5% based on the starting formic acid ester.

EXAMPLE 14

A 100-ml. inner capacity stainless steel autoclave of a shaker type is charged with 2.6 grams (0.433 mol) of methyl formate, and 0.5 gram (0.0085 milligram atom) of metal cobalt obtained by reducing cobalt oxide is added into the autoclave. Carbon monoxide is introduced into the autoclave to attain at a pressure of 200 kg./cm.$^2$ gauge and the reaction is conducted at 250° C. for 1 hour, the maximum pressure being about 480 kg./cm.$^2$ gauge. After termination of the reaction, the autoclave is cooled and the reaction product is taken away therefrom. Precipitates are separated by filtration and the unreacted methyl formate is distilled off. Further distillation of the product liquor gives 2.9 grams of acetic acid. This yield corresponds to a conversion of 11.1% based on the starting methyl formate.

EXAMPLE 15

The reaction is conducted according to the continuous process by employing a 300-ml. inner capacity stainless steel reaction tube of 500 mm. length and 30 mm. inner diameter under the following reaction conditions; a temperature of 220° C., a methyl formate feed rate of 302 grams per hour (5.03 mols per hour), a liquid space velocity of 1.03 hr.$^{-1}$, a pressure of 400 kg./gm.$^2$ gauge, and a carbon monoxide circulating rate of 102 Nl./hr. (4.55 mols per hour). As solvent is fed N,N-dimethylacetamide at a rate of 1 mol per mol of ethyl formate and as catalyst is fed cobalt acetate at a rate of 0.02 mol per mol of methyl formate in the form of an N,N-dimethylacetamide solution. The reaction is carried out for 10 hours continuously. Acetic acid is obtained in a yield of 92.0 grams per hour (1.53 mols per hour). This yield corresponds to a conversion of 30.4% based on the methyl formate feed.

EXAMPLE 16

The continuous reaction is effected by employing the same reaction tube as used in Example 15 under the following reaction conditions; a temperature of 250° C., an ethyl formate feed rate of 254 grams per hour (3.43 mols per hour), a liquid space velocity of 0.92 hr.$^{-1}$, a pressure of 350 kg./cm.$^2$ gauge, a circulating rate of a gas (a mixture of 97 volume percent carbon monoxide and 3 volume percent hydrogen) of 89 Nl./hr. (3.85 mols per hour as reckoned as carbon monoxide), and a feed rate of ethyl propionate as additive of 3 grams per hour (0.03 mol per hour). As solvent is fed N-methylpyrrolidone at a rate of 1.1 mols per mol of ethyl formate and as catalyst is fed cobalt carbonyl at a rate of 19 milligram atoms, reckoned as metal cobalt, per mol of ethyl formate in the form of an N-methylpyrrolidone solution. The reaction is carried out for 12 hours continuously. As a result there is obtained propionic acid in a yield of 75.0 grams per hour (1.01 mols per hour). This yield corresponds to a conversion of 29.5% based on the ethyl formate feed. When the reaction is repeated under the same conditions without addition of ethyl propionate, the conversion is about 26%.

EXAMPLE 17

A 100-ml. inner capacity stainless steel autoclave of a shaker type is charged with 20 grams of methyl formate, and 2 grams of mercuric iodide is added thereto. The reaction is conducted for 1 hour at 220° C. and 300 kg./cm.$^2$ gauge under pressure of carbon monoxide. After termination of the reaction, the autoclave is cooled and the reaction product is taken away therefrom. Precipitates are separated by filtration and the unreacted methyl formate is distilled off. Further distillation of the remaining liquor gives acetic acid in a yield corresponding to a conversion of 13.7% based on the starting methyl formate.

EXAMPLE 18

The reaction is carried out under the same conditions as in Example 17 with the use of 20 grams of N-methyl-2-pyrrolidone as solvent. As a result there is obtained 15.6 grams of acetic acid. This yield corresponds to a conversion of 78% based on the starting methyl formate.

EXAMPLE 19

The same autoclave as used in Example 17 is charged with 20 grams of methyl formate, 20 grams of N-methylacetamide, 1.6 grams of mercuric acetate and 3.2 grams of potassium iodide. Carbon monoxide is introduced in the autoclave under pressure, and the reaction is effected at 220° C. and 320 kg./cm.$^2$ gauge for 1 hour. The reaction product is subjected to after-treatments to give 16.0 grams of acetic acid. This yield corresponds to a conversion of 80.0% based on the starting methyl formate.

EXAMPLE 20

The same autoclave as used in Example 17 is charged with 20 grams of ethyl formate, 20 grams of N-methyl-2-pyrrolidone and 1.5 grams of mercuric bromide, and carbon monoxide is introduced thereinto under pressure. The reaction is effected at a pressure of 400 kg./cm.$^2$ gauge and a temperature of 250° C. for 1 hour. As a result there is obtained propionic acid in a yield of 13.0 grams, which corresponds to a conversion of 65% based on the starting ethyl formate.

EXAMPLE 21

The same autoclave as used in Example 17 is charged with 20 grams of benzyl formate, and 20 grams of N-methyl-2-pyrrolidone and 1.4 grams of mercurous iodide are added thereto. Carbon monoxide is introduced into the autoclave under pressure and the reaction is conducted at a pressure of 300 kg./cm.$^2$ gauge and a temperature of 210° C. for 2 hours. As a result there is obtained phenyl acetic acid in a yield of 12.6 grams, which corresponds to a conversion of 63% based on the starting benzyl formate.

EXAMPLE 22

The same autoclave as used in Example 17 is charged with 20 grams of methyl formate, and 25 grams of acetonitrile as solvent and a combination of 1 gram of metal mercury and 0.5 gram of iodine as catalyst are added into the autoclave. Carbon monoxide is introduced into the autoclave under pressure, and the reaction is carried out at a temperature of 230° C. and a pressure of 330 kg./cm.$^2$ gauge for 1 hour. The reaction product is subjected to after-treatments to give acetic acid in a yield of 14.5 grams, which corresponds to a conversion of 72.5% based on the starting methyl formate.

EXAMPLE 23

A 100-ml. inner capacity stainless steel autoclave of a shaker type is charged with 20.0 grams (0.333 mol) of methyl formate, and N-methylpyrrolidone of 1.0 mol per mol of methyl formate is added thereto. No catalyst is used. Carbon monoxide is introduced into the autoclave under pressure. The reaction is effected at 200° C. for 1 hour. The maximum reaction pressure is about 450 kg./cm.$^2$ gauge. After termination of the reaction the autoclave is cooled and the reaction product is recovered. The unreacted methyl formate is separated by distillation. Further distillation of the remaining liquor gives acetic acid in an amount of 0.8 gram (0.013 mol) which corresponds to a conversion of 3.9% based on the starting methyl formate.

EXAMPLE 24

The same reactor as used in Example 23 is charged with 20.0 grams (0.333 mol) of methyl formate. Further N-methylpyrrolidone of 1.0 mol, cobalt carbonate of 0.10 mol and potassium iodide of 0.15 mol per mol of methyl formate, respectively, are added thereto. Carbon monoxide gas containing 5 volume percent of hydrogen is introduced into the autoclave under pressure and the reaction is carried out at 190° C. for 2 hours. The reaction pressure is 80 kg./cm.$^2$ gauge. The reaction product is subjected to after-treatments to obtain acetic acid in an amount of 10.2 grams (0.170 mol) which corresponds to a conversion of 51.0% based on the starting methyl formate.

EXAMPLE 25

The same reactor as used in Example 23 is charged with 20.0 grams (0.333 mol) of methyl formate. Further quinoline of 1.0 mol, cobalt hydroxide of 0.03 mol and magnesium iodide of 0.03 mol per mol of methyl formate, respectively, are added thereto. Carbon monoxide gas containing 35 volume percent of nitrogen is introduced into the autoclave under pressure and the reaction is carried out at 210° C. for 1 hour. The reaction pressure is 250 kg./cm.$^2$ gauge. The reaction product is subjected to after-treatments to obtain acetic acid in an amount of 12.0 grams (0.200 mol) which corresponds to a conversion of 60.1% based on the starting methyl formate.

EXAMPLE 26

A 100-ml. inner capacity stainless steel autoclave of a shaker type is charged with 20.0 grams (0.333 mol) of methyl formate. Further N-methylpyrrolidone of 1.2 mols, rhodium chloride of 0.05 mol and hydrogen iodide of 0.08 mol per mol of methyl formate, respectively, are added thereto. Carbon monoxide is introduced in the autoclave under pressure. The reaction is effected at 150° C. for 1 hour. The maximum reaction pressure is about 200 kg./cm.$^2$ gauge. After termination of the reaction the autoclave is cooled and the reaction product is recovered. The unreacted methyl formate is separated by distillation. Further distillation of the remaining liquor gives acetic acid in an amount of 4.2 g. (0.700 mol) which corresponds to a conversion of 21.0% based on the starting methyl formate.

EXAMPLE 27

A 100-ml. inner capacity stainless steel autoclave of a shaker type is charged with 20.0 grams (0.278 mol) of vinyl formate. Further are added thereto per mol of starting vinyl formate, respectively, 1.0 mol of N-methyl pyrrolidone as solvent, 0.05 mol of di[tetraethylammonium]-cobalt dibromidediiodide as catalyst and 0.02 mol of hydroquinone as polymerization inhibitor. Carbon monoxide is introduced into the autoclave under pressure. The reaction is effected at 200° C. for 3.0 hours under pressure of 520 kg./cm.$^2$ gauge to give acrylic acid in a yield of 14.3 grams (0.198 mol). This yield corresponds to a conversion of 71.5% based on vinyl formate.

EXAMPLE 28

The same reactor as used in Example 27 is charged with 20.0 grams (0.156 mol) of cyclohexyl formate. Further are added thereto per mol of starting cyclohexyl formate, respectively, 1.0 mol γ-picoline as solvent and 0.055 mol of iron iodide as catalyst. Carbon monoxide is introduced into the autoclave under pressure. The reaction is carried out at 300° C. for 2.0 hours under pressure of 610 kg./cm.$^2$ gauge. As a result there is obtained cyclohexane carboxylic acid in a yield of 10.3 grams (0.081 mol). This yield corresponds to a conversion of 51.5% based on the starting formic acid ester.

EXAMPLE 29

A 100-ml. inner capacity stainless steel autoclave of a shaker type is charged with 22.5 grams (0.150 mol) of 2,3-xylyl formate. Further N-methyl pyrrolidone of 1.0 mol, a complex compound of diethyl acetone-dicarboxylate-cobalt of 0.036 mol and potassium bromate of 0.070 mol per mol of 2,3-xylyl formate, are added into the autoclave. Carbon monoxide is introduced into the autoclave under pressure, and the reaction is conducted at 270° C. for 2.0 hours, the maximum pressure being about 430 kg./cm.$^2$ gauge. After termination of the reaction, the autoclave is cooled and the reaction product is taken away therefrom. The unreacted 2,3-xylyl formate is distilled off. Further distillation of the product liquor gives 9.60 grams (0.064 mol) of 2,3-dimethyl benzoic acid. This yield corresponds to a conversion of 42.7% based on the starting formic acid ester.

EXAMPLE 30

A 100-ml. inner capacity stainless steel autoclave of a shaker type is charged with 22.0 grams (0.179 mol) of 4-pyridyl formate. Further piperidine of 1.0 mol as solvent and nickel bicarbonate of 0.045 mol and magnesium iodate of 0.050 mol as catalyst, are added thereto per mol of starting formic acid ester. Carbon monoxide is introduced into the autoclave under pressure. The reaction is conducted for 2.0 hours at 260° C. and 500 kg./cm.$^2$ gauge. After termination of the reaction, the autoclave is cooled and the reaction product is taken away therefrom. The unreacted 4-pyridyl formate is distilled off. Further distillation of the remaining liquor gives pyridine-4-carboxylic acid in a yield of 4.43 grams (0.036 mol) corresponding to a conversion of 20.1% based on the starting formic acid ester.

EXAMPLES 31–35

Runs are conducted under pressure of carbon monoxide in the same reactor as used in Example 26 by varying the kind of the alkyl radical of the formic acid ester, the kind of the solvent, the kind of the catalyst and other reaction conditions. Results of each run are shown in Table 2.

TABLE 2

| | Example Number | | | | |
|---|---|---|---|---|---|
| | 31 | 32 | 33 | 34 | 35 |
| R of formic acid ester HCOOR | $CH_3$— | $CH_3CH_2$— | $CH_3CH_2CH_2$— | $CH_3CH_2CH_2CH_2$— | $CH_2$= |
| Formic acid ester charged: | | | | | |
| Grams | 20.0 | 20.0 | 21.5 | 22.0 | 20.0 |
| Mols | 0.333 | 0.270 | 0.244 | 0.216 | 0.333 |
| Solvent: | | | | | |
| Kind | N-methyl-acetamide. | Pyridine | N-methyl pyrrolidone. | N-methyl pyrrolidone. | N-methyl pyrrolidone. |
| Amount used (mols per mol of HCOOR) | 1.0 | 0.6 | 1.0 | 1.5 | 1.0 |
| Catalyst: | | | | | |
| Kind | Nickel nitrate, 0.005. | Cobalt oxide, 0.035. | Cobalt sulfate, 0.030. | Ferric chloride, 0.060. | Cobalt iodate, 0.030. |
| Amount used (mols per mol of HCOOR) | Magnesium iodide, 0.005. | Iodic acid, 0.070. | Potassium iodide, 0.070. | | |
| Temperature (° C.) | 250 | 240 | 260 | 250 | 210 |
| Pressure (kg./cm.$^2$ gauge) | 400 | 300 | 250 | 280 | 300 |
| Reaction time (hours) | 2.0 | 1.0 | 1.0 | 1.0 | 1.0 |
| Organic carboxylic acid RCOOH: | | | | | |
| Yield: | | | | | |
| Grams | 7.26 | 8.40 | 4.58 | 1.63 | 16.8 |
| Mols | 0.121 | 0.113 | 0.052 | 0.016 | 0.280 |
| Conversion (percent) (based on the starting HCOOR) | 36.3 | 42.0 | 21.3 | 7.4 | 84.0 |

EXAMPLE 36

The same autoclave as used in Example 30 is charged with 20.0 grams (0.278 mol) of vinyl formate. Further β-picoline of 1.0 mol as solvent, mercury bromide of 0.050 mole as catalyst and hydroquinone of 0.02 mol as polymerization inhibitor per mole of vinyl formate, respectively, are added thereto. Carbon monoxide gas containing 20 volume percent of nitrogen is introduced in the autoclave under pressure, and the reaction is effected at 230° C. and 600 kg./cm.² gauge for 3.0 hours. The reaction product is subjected to after-treatments to give 9.30 grams (0.129 mol) of acrylic acid. This yield corresponds to a conversion of 46.4% based on the starting formic acid ester.

EXAMPLE 37

The same autoclave as used in Example 30 is charged with 20.0 grams (0.333 mol) of methyl formate. Then are added 1.0 mol of N-methyl pyrrolidone and 0.050 mol of mercury acetate per mol of methyl formate, respectively. Carbon monoxide is introduced thereinto under pressure. The reaction is effected at a pressure of 300 kg./cm.² gauge and a temperature of 220° C. for 1 hour. As a result there is obtained acetic acid in a yield of 1.44 grams (0.024 mol), which corresponds to a conversion of 7.2% based on the starting formic acid ester.

EXAMPLE 38

The same autoclave as used in Example 30 is charged with 20.0 grams (0.333 mol) of methyl formate. Further N-methylpyrrolidone of 1.0 mol, zinc carbonate of 0.030 mol and iodine of 0.070 mole per mol of methyl formate, respectively, are added thereto. Carbon monoxide gas containing 8 volume percent of hydrogen is introduced into the autoclave under pressure and the reaction is conducted at a pressure of 300 kg./cm.² gauge and a temperature of 220° C. for 1 hour. As a result there is obtained acetic acid in a yield of 13.6 grams (0.227 mol), which corresponds to a conversion of 68.1% based on the starting methyl formate.

EXAMPLE 39

The reaction is conducted continuously for 24 hours by employing the same reactor as used in Example 4 under the following conditions; a pressure of 300 kg./cm.² gauge, a temperature of 230° C., a methyl formate feed rate of 298 grams per hour (4.97 mols per hour), a liquid space velocity of 1.02 hr.$^{-1}$, and a carbon monoxide circulating rate of 102 Nl./hr. (4.42 mols per hour). As solvent is fed N-methyl pyrrolidone at a rate of 1.1 mol per mol of methyl formate and as catalyst is fed mercuric iodide at a rate of 0.032 mol per mol of methyl formate in the form of a 11.8 weight percent solution in N-methyl pyrrolidone used as solvent. As additive is further fed methyl acetate at a rate of 11 grams per hour (0.15 mol per hour). As a result there is obtained acetic acid in a yield of 242 grams per hour (4.04 mols per hour). This yield corresponds to a conversion of 81.2% based on the methyl formate feed.

What I claim is:

1. A process for the preparation of organic carboxylic acids comprising converting a formic acid ester of the formula $$HCOOR$$

wherein R is an alkyl radical of 1 to 6 carbon atoms, an alkenyl or alkynyl radical of 2 to 6 carbon atoms, or an alicyclic hydrocarbon group of 4 to 10 carbon atoms, into an organic acid of the formula $$RCOOH$$

wherein R is as defined above, at a temperature of from 100° to 350° C. and in the presence of carbon monoxide under a pressure of at least 80 kg./cm.² gauge wherein the partial pressure of carbon monoxide is at least 50 kg./cm.² gauge, the conversion being effected either without a catalyst or in the presence of a metal per se belonging to Group VIII or Group IIb or a salt or a non-salt compound thereof acting as a catalyst, said catalyst being present in an amount of 0.2–200 milligram atoms, reckoned as the metal, per mol of the starting formic acid ester, said conversion being effected in a polar organic solvent.

2. The process of claim 1 wherein a catalyst is used.

3. The process of claim 2 wherein the metal or the compound thereof is selected from the group consisting of the metals and compounds of cobalt, nickel, iron, rhodium, mercury and zinc.

4. The process as described in claim 2 wherein the metal belonging to Group VIII or Group IIb is present as a salt.

5. The process as described in claim 4 wherein the salt is that of a Group VIII metal.

6. The process as described in claim 2 wherein the reaction is conducted in the presence of a catalyst containing a metal of Group VIII.

7. The process as described in claim 6 wherein the catalyst is (a) a Group VIII metal per se, (b) an organic acid salt, (c) a beta-diketone or beta-keto acid ester complex, (d) a hydroxide, (e) a carbonate, (f) a bicarbonate, (g) a nitrate, (h) a sulfate, (i) an oxide, (j) a salt of a halogen oxy-acid, (k) a complex of an organic onium compound, (l) a carbonyl compound or (m) a halide of a metal of Group VIII.

8. The process as described in claim 6 wherein the catalyst is a combination of (A) (a) a Group VIII metal per se, (b) an organic acid salt, (c) a beta-diketone or beta-keto acid ester complex, (d) a hydroxide, (e) a carbonate, (f) a bicarbonate, (g) a nitrate, (h) a sulfate, (i) an oxide or (j) a carbonyl compound of a metal of Group VIII, and (B) (a') a molecular halogen, (b') a hydrohalogenic acid, (c') an alkali metal or alkaline earth metal halide or (d') a halogen oxyacid or its alkali metal or alkaline earth metal salt.

9. The process as described in claim 2 wherein the reaction is conducted in the presence of a catalyst containing a metal of Group IIb of the Periodic Table.

10. The process as described in claim 9 wherein the catalyst is (a) Group IIb metal per se, (b) an organic acid salt, (c) a beta-diketone or beta-keto acid ester complex, (d) a hydroxide, (e) a carbonate, (f) a bicarbonate, (g) a nitrate, (h) a sulfate, (i) an oxide, (j) a salt of a halogen oxyacid (k) a complex of an organic onium compound or (l) a halide of a metal of Group IIb.

11. The process as described in claim 9 wherein the catalyst is a combination of (A) (a) a Group IIb metal per se, (b) an organic acid salt, (c) a beta-diketone or beta-keto acid ester complex, (d) a hydroxide, (e) a carbonate, (f) a bicarbonate, (g) a nitrate, (h) a sulfate or (i) an oxide of a metal of Group IIb and (B) (a') a molecular halogen, (b') a hydrohalogenic acid, (c') an alkali metal or alkaline earth metal halide or (d') a halogen oxyacid or its alkali metal or alkaline earth metal salt.

12. The process as described in claim 2 wherein the organic polar solvent is selected from the group consisting of amides, amines, nitriles and ketones.

13. The process as described in claim 4 wherein the salt is either that of cobalt or mercury.

References Cited

UNITED STATES PATENTS 2,739,169  3/1956  Hagemeyer, Jr. _____ 260—540

FOREIGN PATENTS 837,640  3/1970  Canada _____ 260—532

OTHER REFERENCES

Matthews et al., J.O.C. 35, 1694 (1970).

ROBERT GERSTL, Primary Examiner

U.S. Cl. X.R.

260—293,88, 295 R, 326.13 A, 342.3, 514 L, 515 R, 526 N, 541, 590